United States Patent Office 2,731,950
Patented Jan. 24, 1956

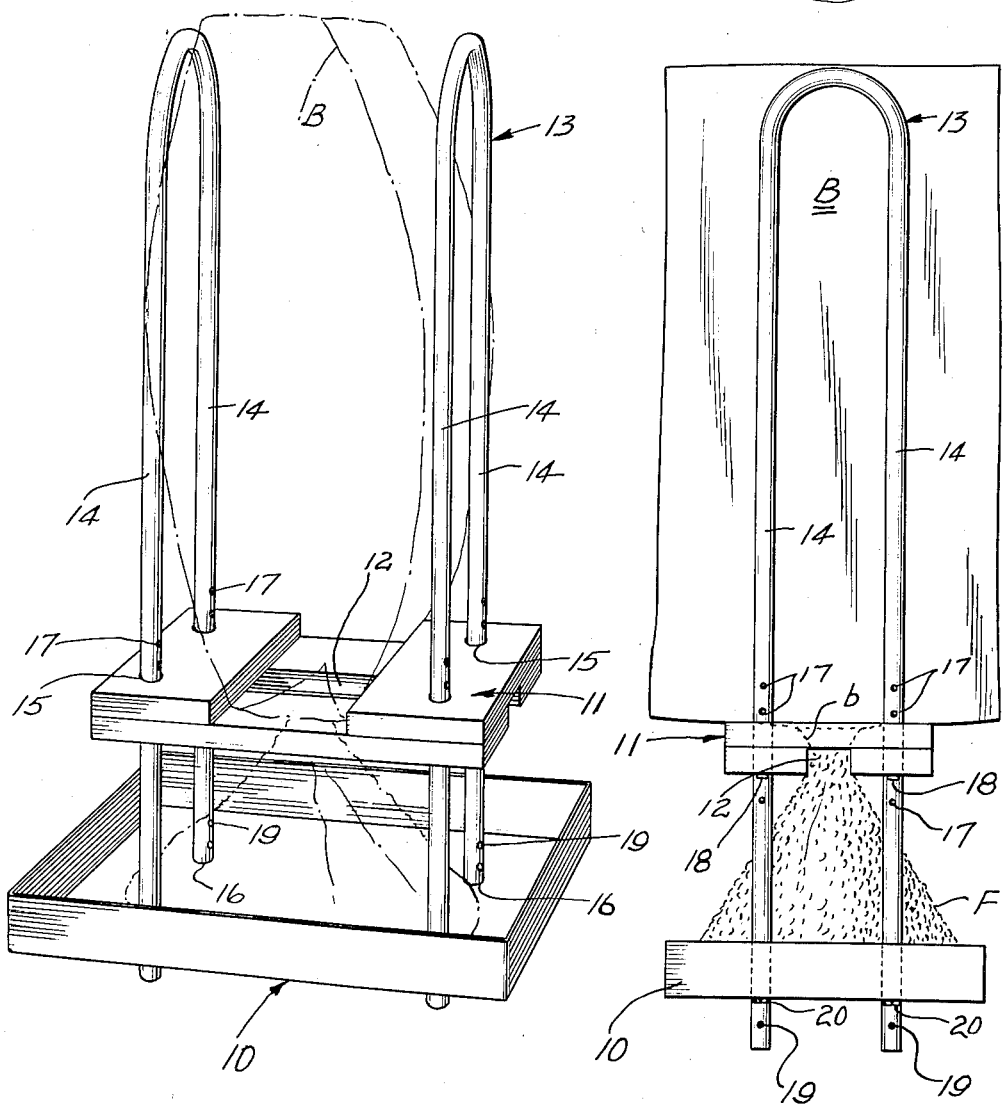

2,731,950
ANIMAL FEEDER

Charles L. Davidson, Lithonia, Ga.

Application November 13, 1953, Serial No. 391,904

10 Claims. (Cl. 119—52)

This invention relates to a poultry and animal feeder. More particularly, my invention relates to means for converting a bag of poultry or animal feed into part of a feeder through the utilization of extremely simple means.

As a feature of my invention, I utilize means for holding a bag of feed in a particular adjusted position relatively to a feed containing tray or similar structure. In this manner, I am able to limit, through the movement of the feed out of the feed bag, the amount of feed to be deposited in the tray. More in detail, there will be created a pyramid of feed in the tray, the apex or upper portion of which will abut an opening in the feed bag to prevent any additional movement of feed out of the bag until the feed in the tray has been consumed to lower the height of the pyramid of feed. Thereby, through this novel and unique arrangement, the movement of feed out of the bag is self-limiting.

More in detail, I utilize extremely simple and novel means functioning simultaneously to hold in assembled adjusted relation the feed containing tray and the bag support plate on which is supported the bag of feed, the same means functioning further, preferably, to hold the feed bag itself in place.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings, Fig. 1 is a perspective view of my invention showing in phantom the feed bag and the feed in the tray.

Fig. 2 is a vertical view of the invention showing the feed bag in place.

Referring now more particularly to the drawings, reference numeral 10 indicates a feed tray that may be formed of metal, and of any desired shape or size. I prefer to use a metal tray having flanges, all as is clear from the drawings. For supporting the feed bag, I use a plate 11 that may be fabricated in any suitable manner and formed with an opening 12 through which feed will flow from a feed bag B shown in phantom in Fig. 1 and in solid lines in Fig. 2.

For assembling the bag support plate 11 to the tray 10, I utilize preferably a pair of U-shaped tubular rods 13. Each U-rod has a pair of legs 14, these legs traversing openings 15 in the bag support plate 11. Preferably, each of the legs 14 will also traverse an opening 16 formed in the tray 10. Several upper transverse holes 17 are formed in the legs 14, and cotter pins 18 may be inserted into these holes for holding the bag support plate 11 in a particular adjusted position relatively to the U-rods 13. Transverse holes 19 are formed near the lower ends of the legs 14 of the U-shaped rods 13, and cotter pins 20 are inserted into these transverse holes for supporting the tray 10.

It will now be appreciated quite clearly that through means of the cotter pins 18, 20 and the transverse holes 17, 19, the tray 10 and bag support plate 11 are assembled to the rods 13 and to one another in particular spaced relation. Simultaneously, the tray 10 is secured to rods 13 so as to be held in particular spaced relation from the ground. Of course, the bag B containing the feed F will naturally also be supported between the rods 13 as clearly shown in Figs. 1 and 2 so that these U-rods 13 function not only as assembling members, but also as supports for the feed bag.

In using my invention, the feed bag has a hole punched in its lower end at b whereby the feed will move from the bag B through the opening 12 into the tray 10. The feed will move until a pyramid-like pile is formed as shown in phantom in Fig. 1, and at F in Fig. 2. The upper part of the pyramid will actually lie within the opening 12 and will function quite effectively to limit the flow of the feed from bag B. Naturally, by adjusting the distance between the plate 11 and tray 10 the amount of feed to be supplied to the tray will be controlled.

Those skilled in the art will appreciate further that the bag support plate 11 and the tray 10 may be formed without openings but with a series of several openings lightly outlined therein so that they may be readily punched. This will allow the assembly of the tray and plate to the U-rods 13 with the U-rods in different relation to one another to accommodate various sizes of feed bags. Those working in the art will, therefore, appreciate that through the extremely simple construction I have devised there is contributed to the art a completely adjustable and adaptable poultry and animal feeder capable of cheap manufacture and easy assembly into almost any relationship that is desired.

I now claim:

1. An animal feeder or the like comprising a tray, a bag support plate, spaced vertically extending support means secured at the periphery of said bag support plate for holding said bag support plate in substantially a horizontal position in vertically spaced relation to said tray, said plate having a relatively small opening adapted for alignment with an opening in a feed bag, and means integral with said support means extending above said bag support plate for holding a feed bag in a vertical position with its bottom on the bag support plate whereby feed will leave an opening in the bottom of said bag and drop through the opening of said plate into said tray.

2. An animal feeder or the like comprising a tray, a bag support plate, means secured to said bag support plate for holding said bag support plate in vertically spaced relation to said tray, said plate having a relatively small opening adapted for alignment with an opening in a feed bag, spaced means secured at spaced points to said bag support plate and extending vertically thereabove for holding a feed bag in a vertical position with its bottom on the bag support plate whereby feed will leave an opening in the bottom of said bag and drop through the opening of said plate into said tray, and means for adjusting the distance between said tray and plate to determine the rate of feed movement out of said bag.

3. An animal feeder or the like comprising a tray, a bag support plate, support means, means between said support means and said bag support plate for holding said bag support plate in vertically spaced relation to said tray, said plate having a relatively small opening adapted for alignment with an opening in a feed bag, means integral with said support means extending above said bag support plate for holding a feed bag in a vertical position with its bottom on the bag support plate whereby feed will leave an opening in the bottom of said bag and drop through the opening of said plate into said tray, and means on said support means for adjusting the distance between said tray and plate to determine the rate of feed movement out of said bag.

4. An animal feeder or the like comprising a tray, four vertical rods extending upwardly from said tray, a bag support plate, means extending between said vertical rods and bag support plate whereby said vertical rods hold said bag support plate in vertically spaced relation to said tray, said plate having a relatively small opening adapted for alignment with an opening in a feed bag, portions of said vertical rods extending above said bag support plate holding a feed bag in a vertical position with its bottom on the bag support plate whereby feed will leave an opening in the bottom of said bag and drop through the opening of said plate into said tray.

5. An animal feeder or the like comprising a tray, four vertical rods extending upwardly from said tray, a bag support plate, said rods traversing openings in said plate, means secured to said rods under said plate whereby to hold said bag support plate in vertically spaced relation to said tray, said plate having a relatively small opening adapted for alignment with an opening in a feed bag, said vertical rods extending above said bag support plate for holding a feed bag in a vertical position with its bottom on the bag support plate whereby feed will leave an opening in the bottom of said bag and drop through the opening of said plate into said tray.

6. An animal feeder or the like comprising a tray, vertical rods extending upwardly from said tray, a bag support plate, means extending between said vertical rods and bag support plate whereby said vertical rods hold said bag support plate in vertically spaced relation to said tray, said plate having a relatively small opening adapted for alignment with an opening in a feed bag, said vertical rods extending above said bag support plate for holding a feed bag in a vertical position with its bottom on the bag support plate whereby feed will leave an opening in the bottom of said bag and drop through the opening of said plate into said tray, and means for adjusting the distance between said tray and plate to determine the rate of feed movement out of said bag.

7. An animal feeder or the like comprising a tray, a pair of inverted U-rods, means securing the four legs of said U-rods to the tray in vertical position with the closed rounded ends substantially above said tray, a bag support plate, means extending between said bag support plate and legs for securing said bag support plate to said legs in vertically spaced relation to said tray, said plate having a relatively small opening adapted for alignment with an opening in a feed bag, said U-rods holding a feed bag in a vertical position with its bottom on the bag support plate whereby feed will leave an opening in the bottom of said bag and drop through the opening of said plate into said tray.

8. An animal feeder or the like comprising a tray, a pair of inverted U-rods, means securing the four legs of said U-rods to the tray in vertical position with the closed rounded ends substantially above said tray, a bag support plate, means extending between said bag support plate and legs for securing said bag support plate to said legs in vertically spaced relation to said tray, said plate having a relatively small opening adapted for alignment with an opening in a feed bag, said U-rods holding a feed bag in a vertical position with its bottom on the bag support plate whereby feed will leave an opening in the bottom of said bag and drop through the opening of said plate into said tray, and means for adjusting the position of said support plate on said legs relatively to said tray to determine the rate of feed movement out of said bag.

9. In an animal feeder or the like, a series of vertical rods, a bag support plate, means extending between said rods and bag support plate whereby said vertical rods secure said bag support plate in a horizontal position in vertically spaced relation to the lower ends of said rods, said plate having a relatively small opening adapted for alignment with an opening in a feed bag, portions of said vertical rods extending above said bag support plate and spaced relatively to one another for holding a feed bag in a vertical position with its bottom on the bag support plate whereby feed will leave an opening in the bottom of said bag and drop through the opening of said plate toward the plane passing through the lower ends of said rods, a tray adapted to be secured to said rods below said bag support plate to receive feed dropping through said small opening in said plate, and said securing means for said bag support plate and tray being adjustable relatively to one another for adjusting the distance between said tray and plate to determine the rate of feed movement out of said bag.

10. An animal feeder or the like comprising a bag support plate, spaced means secured to said bag support plate and comprising parts above and parts below said plate with the parts below said plate holding said bag support plate in substantially a horizontal position in vertically spaced relation relatively to the lower ends of said parts, said plate having a central transverse relatively shallow groove with a small vertical opening therethrough medial of the length of said groove adapted for alignment with an opening in a feed bag, and said parts above said bag support plate holding a feed bag in a vertical position with its bottom on the bag support plate whereby feed will leave an opening in the bottom of said bag and drop through the opening of said plate.

References Cited in the file of this patent

UNITED STATES PATENTS

| 387,892 | Light | Aug. 14, 1888 |
| 553,752 | Goff | Jan. 28, 1896 |
| 665,275 | Shanley | Jan. 1, 1901 |
| 957,652 | Bush | May 10, 1910 |
| 1,230,734 | Lilja | June 19, 1917 |
| 1,427,021 | Rudolph | Aug. 22, 1922 |
| 1,520,279 | Cytron | Dec. 23, 1924 |
| 2,681,746 | Hawkins et al. | June 22, 1954 |

FOREIGN PATENTS

| 24,038 | Great Britain | 1903 |